(12) United States Patent
He

(10) Patent No.: US 12,483,788 B2
(45) Date of Patent: Nov. 25, 2025

(54) CAMERA MODULE AND ELECTRONIC DEVICE

(71) Applicant: VIVO MOBILE COMMUNICATION CO., LTD., Dongguan (CN)

(72) Inventor: Guanghui He, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 260 days.

(21) Appl. No.: 18/344,145

(22) Filed: Jun. 29, 2023

(65) Prior Publication Data

US 2023/0345126 A1     Oct. 26, 2023

Related U.S. Application Data

(63) Continuation of application No. PCT/CN2021/142767, filed on Dec. 30, 2021.

(30) Foreign Application Priority Data

Dec. 31, 2020 (CN) .......................... 202011637986.5

(51) Int. Cl.
  *H04N 23/68* (2023.01)
  *H04N 23/51* (2023.01)
  *H04N 23/54* (2023.01)

(52) U.S. Cl.
  CPC ........... *H04N 23/685* (2023.01); *H04N 23/51* (2023.01); *H04N 23/54* (2023.01)

(58) Field of Classification Search
  CPC ...... H04N 23/685; H04N 23/51; H04N 23/54; H04N 23/698; H04N 23/55;
  (Continued)

(56) References Cited

U.S. PATENT DOCUMENTS

2015/0116514 A1    4/2015  Kim et al.
2019/0137780 A1*   5/2019  Arai ..................... H04N 23/687
(Continued)

FOREIGN PATENT DOCUMENTS

CN      104570267 A    4/2015
CN      106444219 A    2/2017
(Continued)

OTHER PUBLICATIONS

International Search Report & Written Opinion related to Application No. PCT/CN2021/142767; reported on Mar. 21, 2022.
(Continued)

*Primary Examiner* — Yogesh K Aggarwal
(74) *Attorney, Agent, or Firm* — von Briesen & Roper, s.c.

(57) ABSTRACT

Provided are a camera module and an electronic device. The camera module includes a first module housing, a second module housing, a first bracket, a first rotating member, a second rotating member, a third rotating member, a driving mechanism, and a camera body. The camera body is connected to the first module housing through the first bracket, the first rotating member is between the first bracket and the camera body, and the driving mechanism may drive, through the first rotating member, the camera body to rotate around a first axis. The second rotating member is between the first bracket and the first module housing, and the driving mechanism drives the first bracket to rotate. The first module housing is rotatably connected to the second module housing through the third rotating member, and the driving mechanism may drive, through the third rotating member, the first module housing to rotate.

20 Claims, 7 Drawing Sheets

(58) Field of Classification Search
CPC .. H04N 23/6812; H04N 23/687; H04N 23/57; H04N 23/50; H04N 23/68; H04N 23/695; G03B 2205/0015; G03B 2205/0038; G03B 2205/0069; G03B 30/00; G03B 5/00; G03B 2205/0007; G02B 27/646
See application file for complete search history.

(56) References Cited

U.S. PATENT DOCUMENTS

| | | |
|---|---|---|
| 2019/0373145 A1 | 12/2019 | Yu et al. |
| 2020/0018989 A1 | 1/2020 | Kitayama et al. |
| 2022/0137486 A1 | 5/2022 | Oh |
| 2022/0224807 A1 | 7/2022 | Lu et al. |

FOREIGN PATENT DOCUMENTS

| | | |
|---|---|---|
| CN | 208707750 U | 4/2019 |
| CN | 110572556 A | 12/2019 |
| CN | 110673656 A | 1/2020 |
| CN | 111752066 A | 10/2020 |
| CN | 111917965 A | 11/2020 |
| CN | 111917966 A | 11/2020 |
| CN | 112822363 A | 5/2021 |
| JP | 2015201714 A | 11/2015 |
| JP | 2020204648 A | 12/2020 |
| KR | 20190138344 A | 12/2019 |
| KR | 20200114252 A | 10/2020 |

OTHER PUBLICATIONS

First Chinese Office Action for related Application No. 202011637986.5; reported on Jan. 11, 2022.
First Korean Office Action related to Application No. 10-2023-7025226; reported on Feb. 14, 2025.
Extended European Search Report related to Application No. 21914582.8; reported on May 27, 2024.

* cited by examiner

//]: #

CAMERA MODULE AND ELECTRONIC DEVICE

CROSS-REFERENCE TO RELATED APPLICATIONS

The present invention is a continuation application of PCT Application No. PCT/CN2021/142767 filed on Dec. 30, 2021, which claims priority to Chinese Patent Application No. 202011637986.5, entitled "CAMERA MODULE AND ELECTRONIC DEVICE" and filed with the China National Intellectual Property Administration on Dec. 31, 2020, disclosures of which are incorporated herein by reference in their entireties.

TECHNICAL FIELD

This application belongs to the technical field of communication devices, and specifically relates to a camera module and an electronic device.

BACKGROUND

With the development of technologies, electronic devices (such as mobile phones and tablet computers) have been highly developed. As a tool with powerful functions, the electronic devices have greatly facilitated the life and work of users. A camera function is a basic function of an electronic device, and can meet a photographing requirement of a user. The camera function is usually implemented by a camera module of the electronic device.

In the process of implementing the present invention, the inventor discovers the following problem in the related art: A user usually holds an electronic device to photograph an image, and the image photographed through the camera module has poor quality due to jitters in the hand-held photographing process.

SUMMARY

According to a first aspect, an embodiment of this application provides a camera module, comprising a first module housing, a second module housing, a first bracket, a first rotating member, a second rotating member, a third rotating member, a driving mechanism, and a camera body, where the second module housing is provided with a second inner cavity, and the first module housing is located in the second inner cavity;

the first module housing is provided with a first inner cavity, at least part of the first bracket is arranged in the first inner cavity, at least part of the camera body is arranged in the first inner cavity, the camera body is connected to the first module housing through the first bracket, the first rotating member is arranged between the first bracket and the camera body, and the driving mechanism drives, through the first rotating member, the camera body to rotate around a first axis;

the second rotating member is arranged between the first bracket and the first module housing, and the driving mechanism drives the first bracket to rotate around a second axis; and the first module housing is rotatably connected to the second module housing through the third rotating member, the driving mechanism drives, through the third rotating member, the first module housing to rotate around a third axis, the third axis intersects with a first plane, and the first plane is a plane in which the first axis and the second axis are located.

According to a second aspect, an embodiment of this application provides an electronic device, including the foregoing camera module.

REFERENCE NUMERALS

100—first module housing, 110—first framework, 120—first top plate, 121—first avoidance hole, 130—first bottom plate,
200—second module housing, 210—second framework, 220—second top plate, 221—second avoidance hole, 222—first through hole, 223—second through hole, 230—second bottom plate,
300—first bracket, 310—bracket body, 320—first connecting arm, 330—second connecting arm,
400—camera body, 410—camera, 420—second bracket,
510—central ball, 520—edge ball, 530—abutting ball, 540—sliding groove, 550—second positioning hole, 560—third positioning hole,
600—driving mechanism, 610—coil assembly, 620—magnet assembly,
700—detection element,
800—circuit board, and 810—control chip.

DETAILED DESCRIPTION

The following clearly describes the technical solutions in the embodiments of this application with reference to the accompanying drawings in the embodiments this application. Apparently, the described embodiments are some but not all of the embodiments of this application. All other embodiments obtained by a person of ordinary skill in the art based on the embodiments of this application shall fall within the protection scope of this application.

The specification and claims of this application, and terms such as "first" and "second" are used to distinguish similar objects, but are not used to describe a specific sequence or order. It should be understood that the data so used may be interchanged in an appropriate condition, so that the embodiments of this application can be implemented in an order other than those illustrated or described herein. In addition, "and/or" in this specification and the claims represents at least one of the connected objects. The character "I" in this application generally indicates an "or" relationship between the associated objects.

A camera module provided in the embodiments of this application is described in detail below with reference to the accompanying drawings by using specific embodiments and application scenarios thereof.

Figure 1:
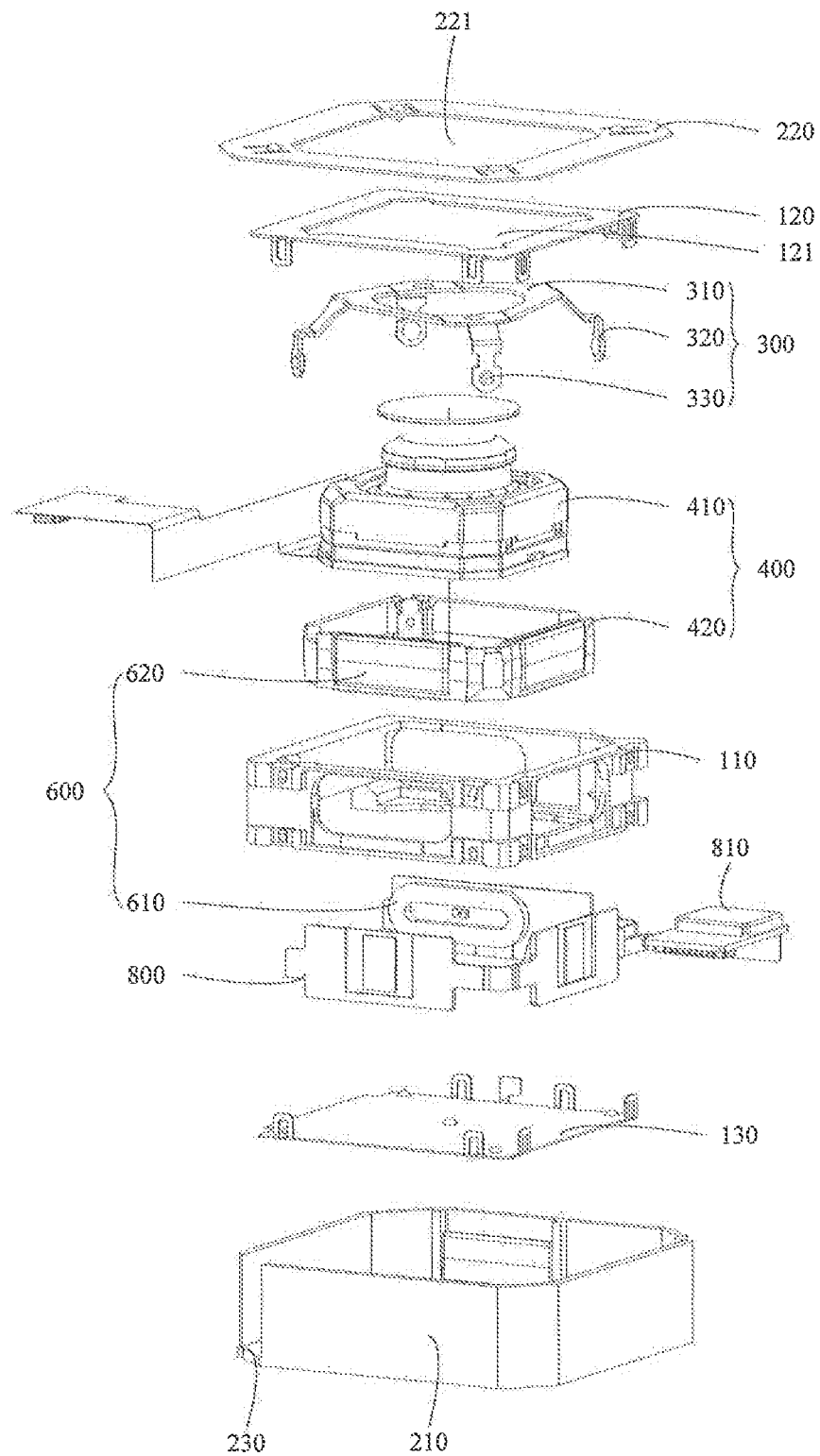
FIG. 1 is an exploded view of a camera module according to an embodiment of this application.
Figure 2:
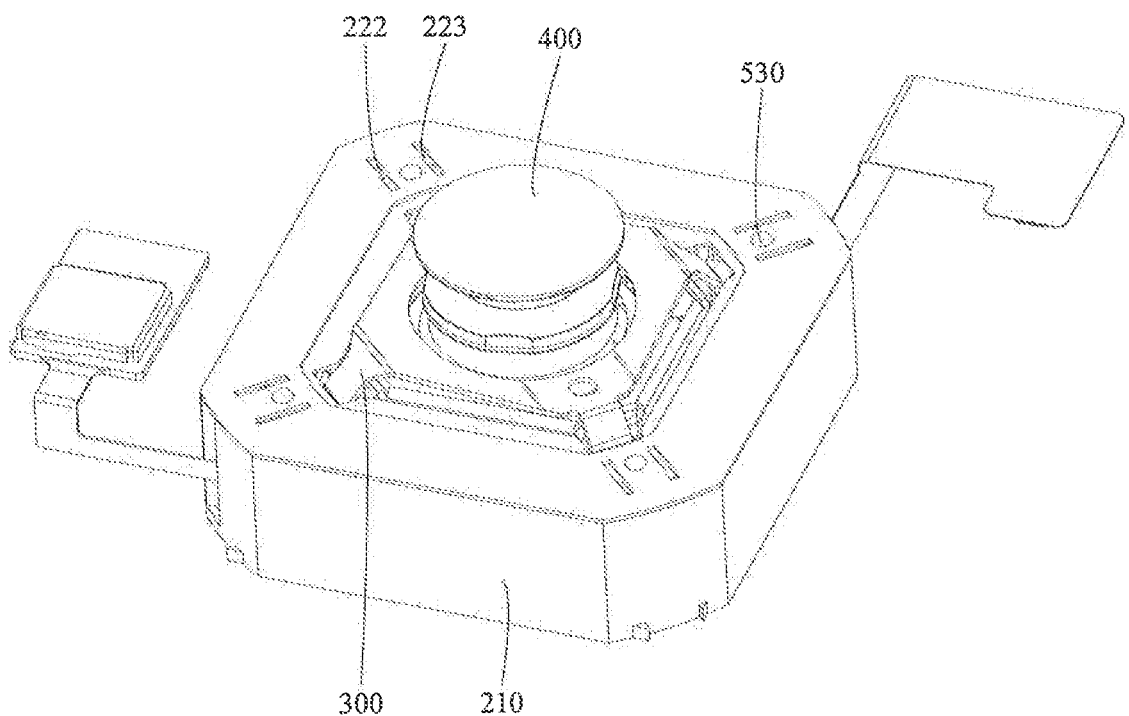
FIG. 2 to FIG. 4 are schematic structural diagrams of a camera module according to an embodiment of this application.
Figure 3:
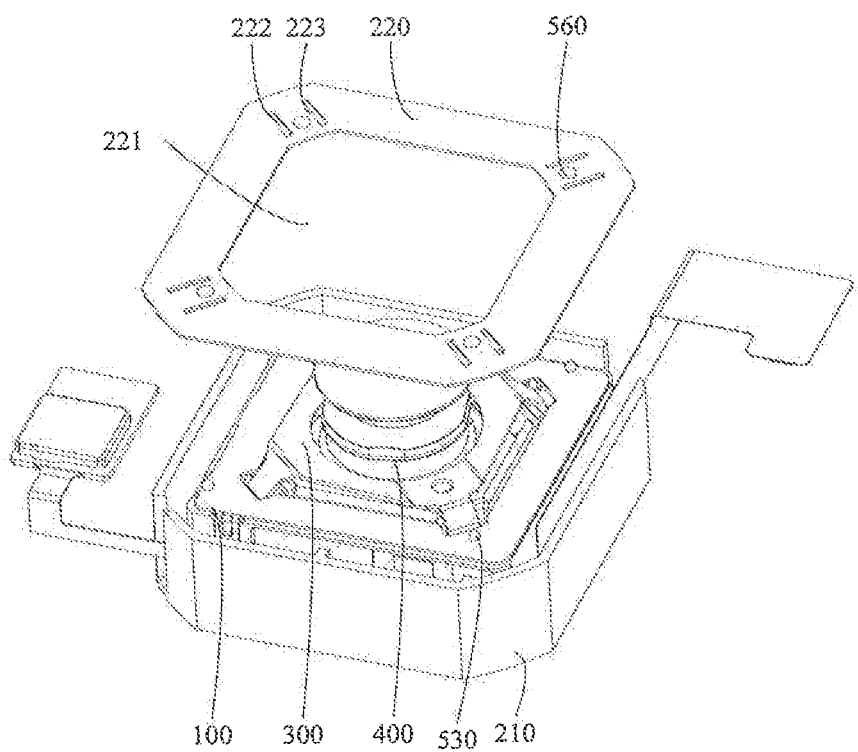
Figure 4:
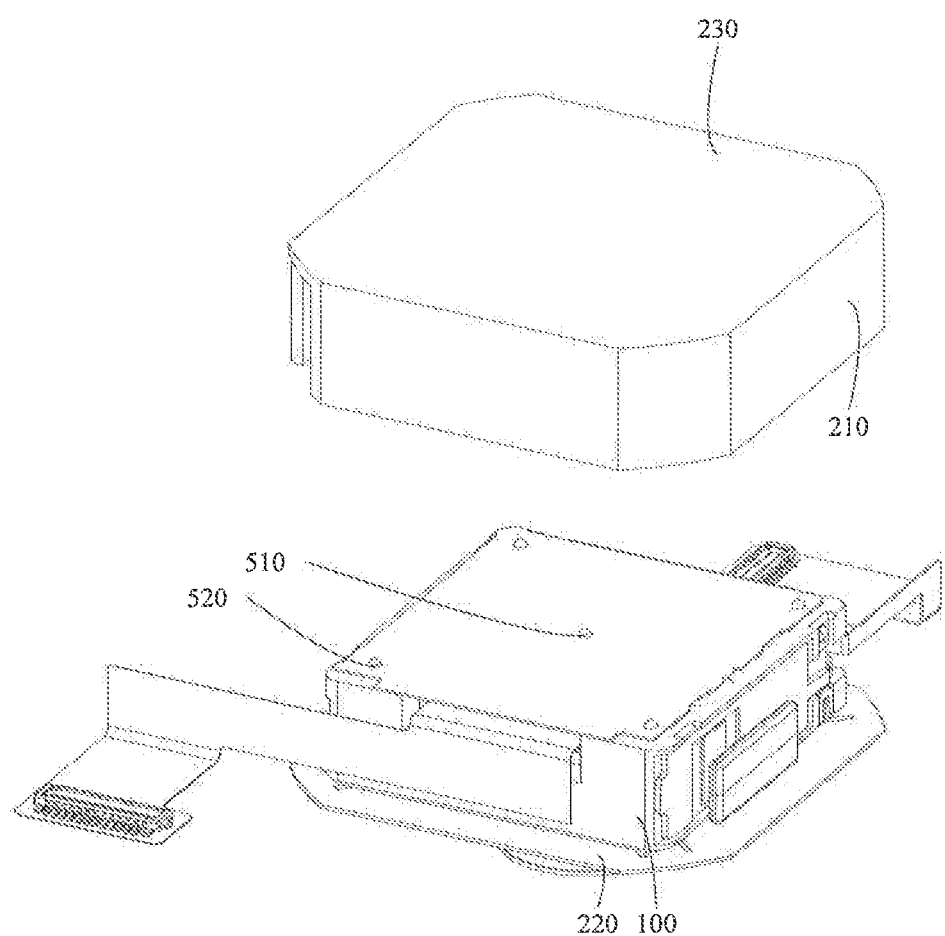
Figure 5:
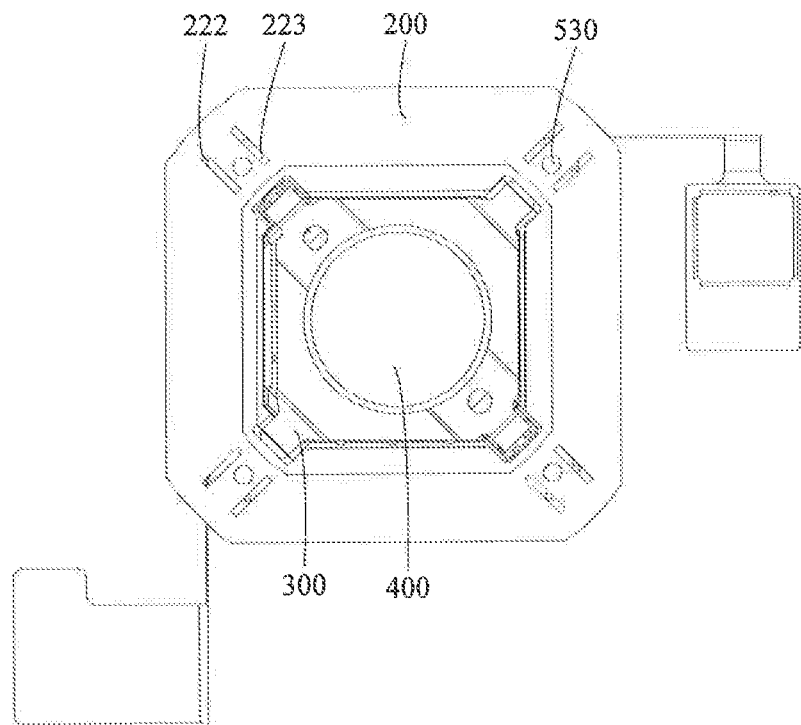
FIG. 5 is a top view of a camera module according to an embodiment of this application.
Figure 6:
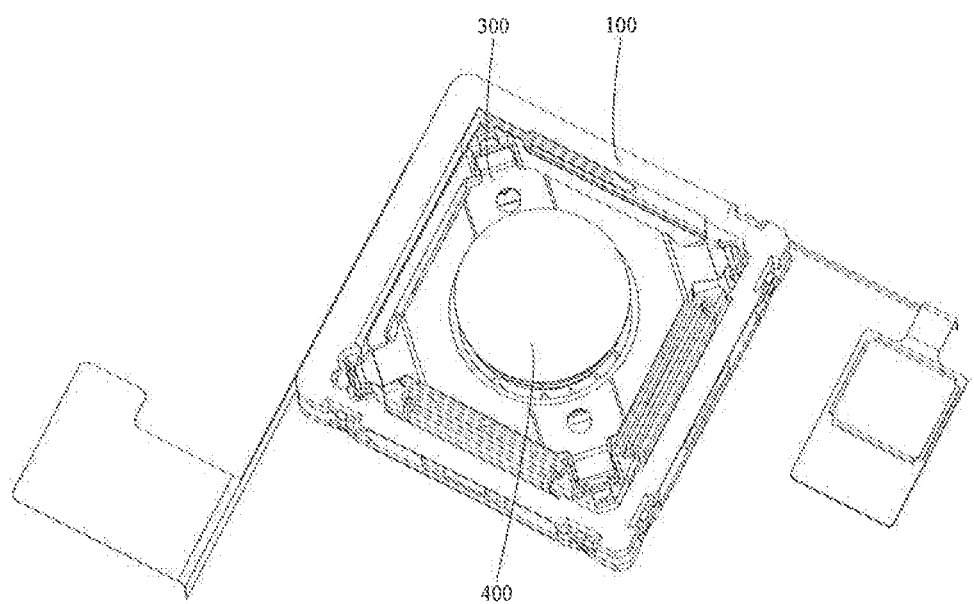
FIG. 6 to FIG. 11 are schematic structural diagrams of some components of a camera module according to an embodiment of this application.
Figure 7:
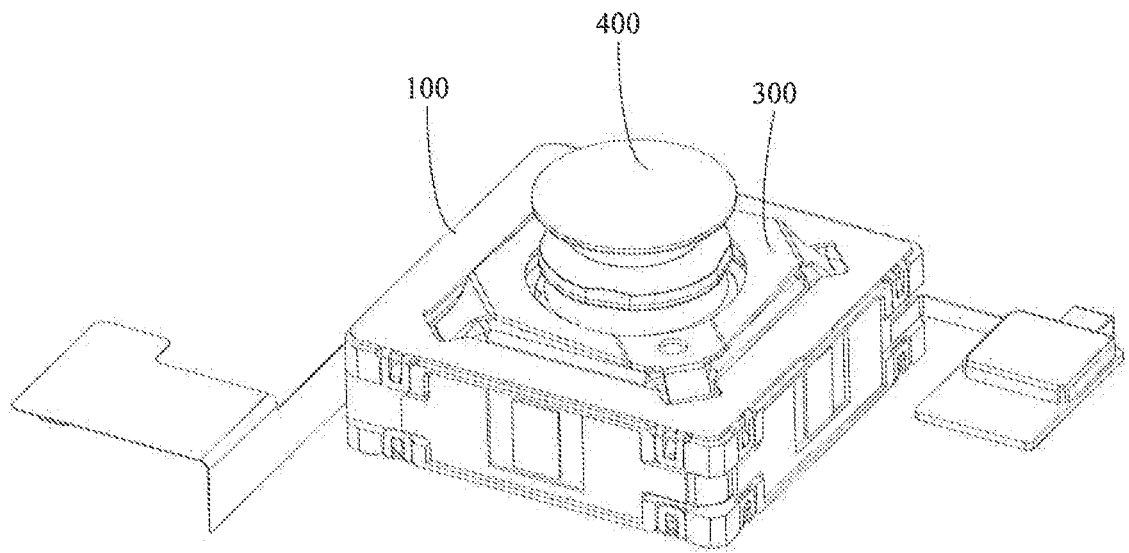
Figure 8:
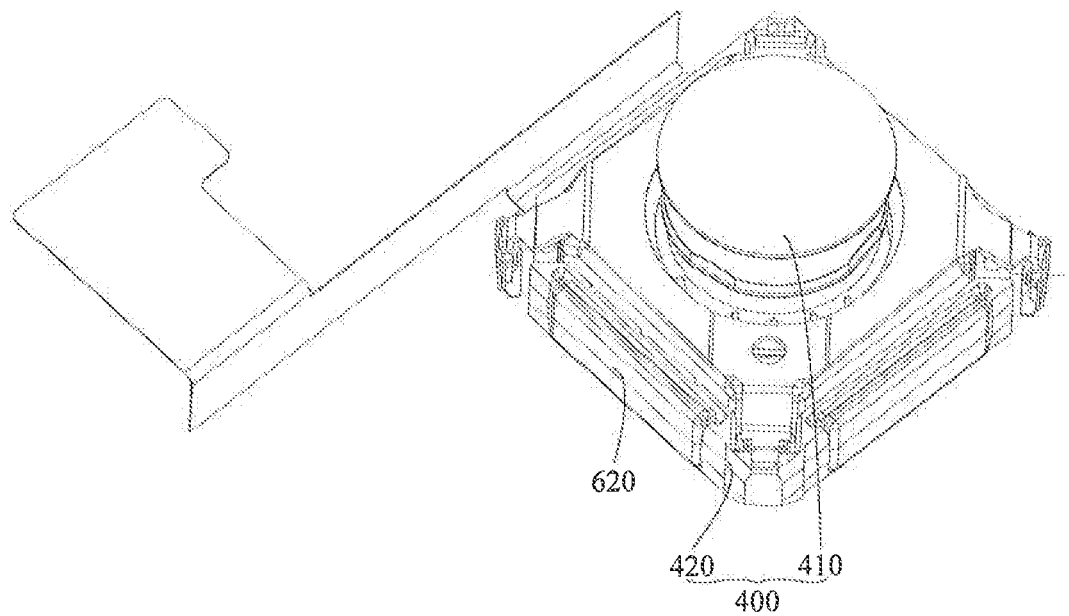
Figure 9:
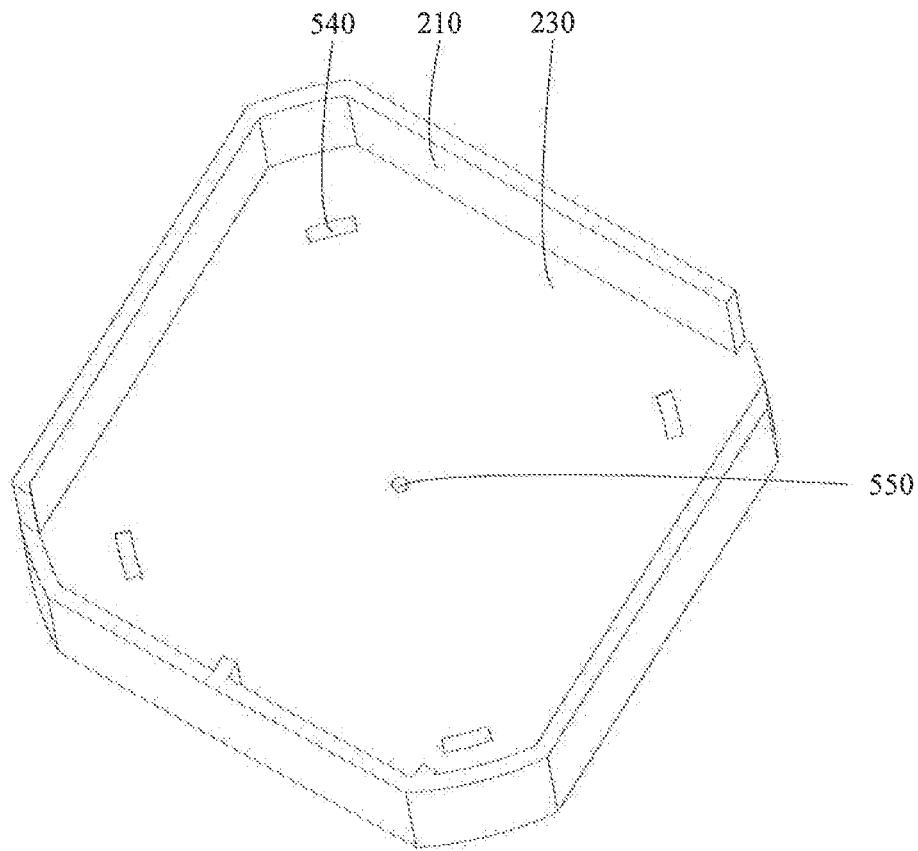
Figure 10:
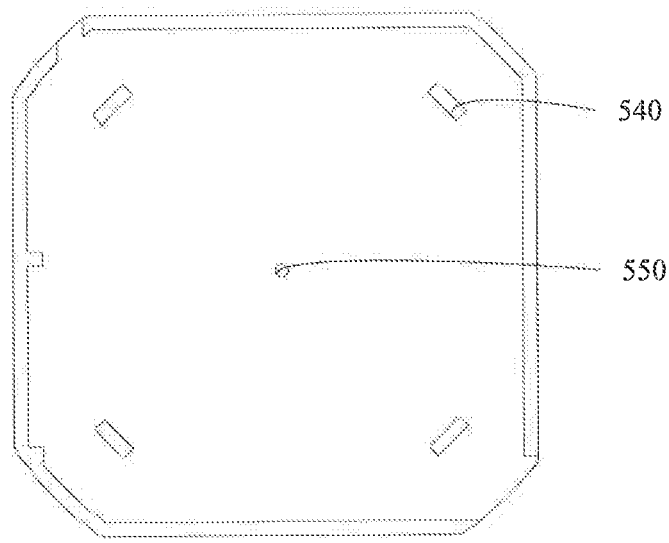
Figure 11:
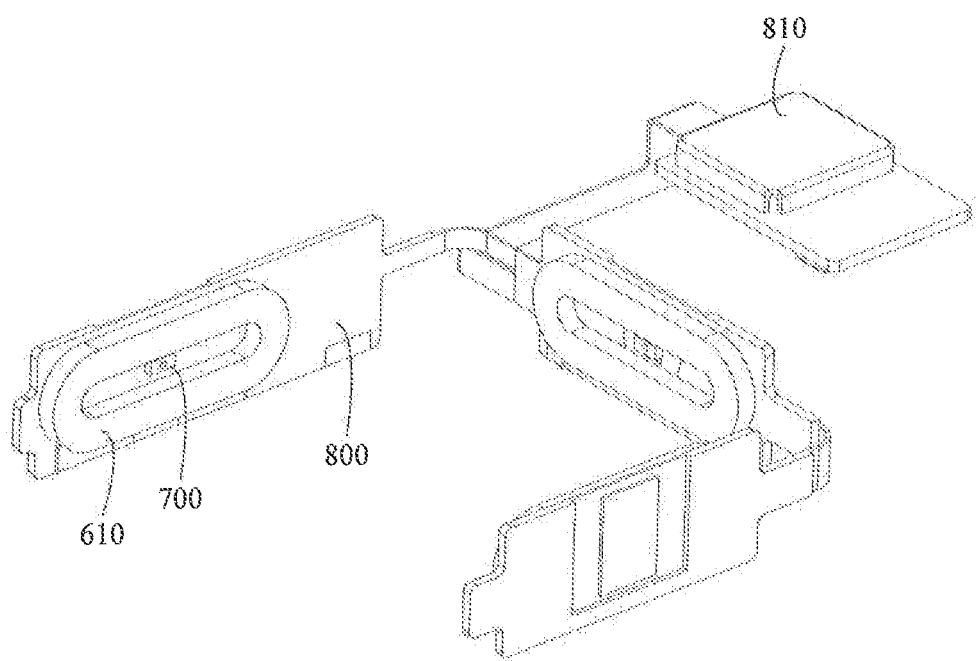

Referring to FIG. 1 to FIG. 11, a camera module is disclosed in the embodiments of this application, and the disclosed camera module is used in an electronic device. The disclosed camera module includes a first module housing 100, a second module housing 200, a first bracket 300, a first rotating member, a second rotating member, a third rotating member, a driving mechanism 600, and a camera body 400.

The second module housing 200 provides a basis for mounting the first module housing 100 of the camera module and another component. The second module housing 200 is provided with a second inner cavity, and the first module housing 100 is located in the second inner cavity.

The first module housing 100 is provided with a first inner cavity, and at least part of the first bracket 300 is arranged in the first inner cavity. At least part of the camera body 400 may be arranged in the first inner cavity, and the camera body 400 is connected to the first module housing 100 through the first bracket 300.

The first rotating member is arranged between the first bracket 300 and the camera body 400, and the first bracket 300 is rotatably connected to the camera body 400 through the first rotating member. The driving mechanism 600 may drive, through the first rotating member, the camera body 400 to rotate around a first axis.

The second rotating member is arranged between the first bracket 300 and the first module housing 100, and the first bracket 300 is rotatably connected to the first module housing 100 through the second rotating member. The driving mechanism 600 drives the first bracket 300 to rotate around a second axis. In this case, when the driving mechanism 600 drives the first bracket 300 to rotate around the second axis, the camera body 400 may rotate around the second axis together with the first bracket 300 because the first bracket 300 and the camera body 400 are relatively fixed to each other.

The first module housing 100 is rotatably connected to the second module housing 200 through the third rotating member. The driving mechanism 600 may drive, through the third rotating member, the first module housing 100 to rotate around a third axis. In this case, when the driving mechanism 600 drives the first module housing 100 to rotate around the third axis, the camera body 400 may rotate around the third axis together with the first module housing 100 because the first bracket 300 and the camera body 400 are relatively fixed to the first module housing 100.

The third axis intersects with a first plane, where the first plane is a plane in which the first axis and the second axis are located. In this case, the first axis may be parallel to or intersect with the second axis.

In this embodiment disclosed in this application, the camera body 400 rotates relative to the first bracket 300 around the first axis, a unity formed by the camera body 400 and the first bracket 300 rotates relative to the first module housing 100 around the second axis, and a unity formed by the camera body 400, the first bracket 300, and the first module housing 100 rotates relative to the second module housing 200 around the third axis. Because the third axis intersects with the plane in which the first axis and the second axis are located, the rotation of the camera body 400 in the three directions can compensate angle components of an inclination in the three directions caused by jitters of the camera module, and can finally perform effective image stabilization on the camera module, thereby improving the image photographing quality of the camera module.

In addition, the camera body 400 rotates in the three directions, and therefore the camera module can realize photographing in a wider field of view.

In another optional embodiment, every two of the first axis, the second axis, and third axis intersect with each other. In this solution, a rotation direction of the camera body 400 relative to the first bracket 300, a rotation direction of the first bracket 300 relative to the first module housing 100, and a rotation direction of the first module housing 100 relative to the second module housing 200 are different from each other. In this solution, an angle of image stabilization on the camera module can be increased, thereby further improving the photographing performance of the camera module.

Preferably, every two of the first axis, the second axis, and the third axis are perpendicular to each other. In this case, an inclination angle caused by jitters of the camera module during the photographing process is easily decomposed into three angle components along the first axis, the second axis, and the third axis, and therefore the camera body 400 performs angle compensation in the three directions when rotating.

The first axis may be a diagonal line of the camera module, the second axis may be another diagonal line of the camera module, and the third axis may be an optical axis of the camera module. In this case, the first module housing 100, the first bracket 300, and the camera body 400 rotate around the optical axis of the camera module. Because a photosensitive chip in an actual camera module is usually in a cuboid shape, when the camera module jitters, a focal point of the camera module and a transmission direction of light may possibly deviate. Therefore, the rotation of the camera body 400 around the optical axis of the camera module can make the focal point of the camera module and the transmission direction of light not easy to deviate, thereby further improving the photographing quality of the camera module.

In this embodiment of this application, a structure of the first module housing 100 may be of various types. Still referring to FIG. 1, in a specific embodiment, the first module housing 100 may include a first framework 110, a first top plate 120, and a first bottom plate 130. The first top plate 120 is arranged on an end opening of an end of the first framework 110, and the first bottom plate 130 may be arranged on an end opening of an other end of the first framework 110. The first framework 110, the first top plate 120, and the first bottom plate 130 form the first inner cavity. The first top plate 120 is provided with a first avoidance hole 121, and the first avoidance hole 121 is connected to the first inner cavity. The first module housing 100 with the foregoing structure is conducive to assembly, and is convenient for mounting the camera body 400.

Optionally, the first framework 110 and the first top plate 120 may be connected to each other by clamping, bonding, welding, or the like, and the first framework 110 and the first bottom plate 130 may also be connected to each other by clamping, bonding, welding, or the like. Alternatively, in a specific embodiment, the first framework 110 and the first top plate 120 are connected by clamping, and the first framework 110 and the first bottom plate 130 are integrally formed. In this case, the first framework 110 and the first bottom plate 130 are integrally formed and do not need assembly, the first bracket 300 and the camera body 400 may be placed in the first framework 110 through an end opening of an end of the first framework 110, and then the first top plate 120 is placed on the top, thereby finishing assembly.

In this embodiment of this application, a structure of the second module housing 200 may be of various types. Still referring to FIG. 1, in a specific embodiment, the second module housing 200 may include a second framework 210, a second top plate 220, and a second bottom plate 230. The second top plate 220 may be arranged on an end opening of an end of the second frame work 210, and the second bottom plate 230 may be arranged on an end opening of an other end of the second framework 210. The second framework 210, the second top plate 220, and the second bottom plate 230 form the second inner cavity. The second top plate 220 is provided with a second avoidance hole 221, where the second avoidance hole 221 may be connected to the second inner cavity. The second module housing 200 with the foregoing structure is conducive to assembly, and is convenient for mounting of the camera module.

The second module housing 200 may also have the same structure as the first module housing 100. Therefore, this is not described herein again.

Still further, the first avoidance hole 121 and the second avoidance hole 221 may be distributed opposite to each other. In this case, the camera module may extend out of the first module housing 100 and the second module housing 200 through the first avoidance hole 121 and the second avoidance hole 221, so that the first module housing 100 and the second module housing 200 are not easy to interfere with the camera body 400, thereby facilitating the assembly of the camera module.

In order to improve the rotation performance of the first module housing 100 and the second module housing 200, in another optional embodiment, the third rotating member may be arranged between the first bottom plate 130 and the second bottom plate 230. The third rotating member may include a central ball 510 and a plurality of edge balls 520. A center of the central ball 510 coincides with the third axis, and the plurality of edge balls 520 may surround the central ball 510. In this case, the central ball 510 and the edge balls 520 have a small area of contact with the first module housing 100 and the second module housing 200, so that friction between the central ball 510 and the edge balls 520 and the first module housing 100 and the second module housing 200 is small, thereby improving the rotation performance of the first module housing 100 and the second module housing 200.

Still further, one of the first bottom plate 130 and the second bottom plate 230 may be provided with a first positioning hole, and the other may be provided with a sliding groove 540. An extending direction of the sliding groove 540 is the same as a rotation direction of the first module housing 100. A quantity of sliding grooves 540, a quantity of first positioning holes, and a quantity of the edge balls 520 are the same. The first positioning hole is in limiting coordination with the edge ball 520. Part of the edge ball 520 may be located in the sliding groove 540, and the sliding groove 540 may be in a sliding fit with the edge ball 520. Optionally, the sliding groove 540 may be a straight-strip-shaped sliding groove, or may be an arc-shaped sliding groove. Besides, a cross section of the sliding groove 540 may be rectangular, or certainly may be in an isosceles trapezoid shape or a circular arc shape, so as to further reduce friction between the edge ball 520 and the sliding groove 540.

In this solution, the sliding groove 540 and the first positioning hole can auxiliarily limit a position of the edge ball 520, so as to prevent the edge ball 520 from shifting. In this way, a rotation axis of the first module housing 100 is not easy to deviate, and the camera module has better image stabilization performance.

In the foregoing embodiment, the central ball 510 is also easy to deviate. Therefore, in another optional embodiment, a second positioning hole 550 may be opened on the first bottom plate 130 and/or the second bottom plate 230, and part of the central ball 510 may be located in the second positioning hole 550. The second positioning hole 550 may be in limiting coordination with the central ball 510. In this solution, the second positioning hole 550 can limit a position of the central ball 510, so as to prevent the central ball from deviating.

In the foregoing embodiment, the first top plate 120 may be in direct contact with the second top plate 220, and in this case, the first top plate 120 and the second top plate 220 have a large area of contact. As a result, phenomena such as jamming are prone to occur during the rotation of the first module housing 100 and the second module housing 200.

Based on this, in another optional embodiment, the camera module disclosed in this application may be provided with an abutting ball 530, and the abutting ball 530 may be arranged between the second top plate 220 and the first top plate 120. In this solution, in this case, the abutting ball 530 has a small area of contact with the first module housing 100 and the second module housing 200, so that friction between the abutting ball 530 and the first top plate 120 and between the abutting ball 530 and the second top plate 220 is small, thereby improving the rotation performance of the first module housing 100 and the second module housing 200.

In addition, the abutting ball 530 can exert pre-pressure on the first top plate 120, so that the first module housing 100 is not easy to shake in the second inner cavity, thereby improving assembly reliability of the first module housing 100 and the second module housing 200.

In the foregoing embodiment, the abutting ball 530 is also easy to deviate. Therefore, in another optional embodiment, the first top plate 120 or the second top plate 220 may be provided with a third positioning hole 560. The third positioning hole 560 is in a one-to-one correspondence with the abutting ball 530, and part of the abutting ball 530 may be located in the third positioning hole 560. In this solution, the third positioning hole 560 can limit a position of the abutting ball 530, thereby preventing the abutting ball 530 from deviating.

In another optional embodiment, the first top plate 120 or the second top plate 220 may be provided with a first through hole 222 and a second through hole 223, and the abutting ball 530 may be located between the first through hole 222 and the second through hole 223. In this solution, the first top plate 120 or the second top plate 220 are provided with two through holes in a region near a region where the abutting ball 530 abuts. In this way, the region where the abutting ball 530 abuts can have elastic deformation, and the abutting ball 530 is more reliably located between the first top plate 120 and the second top plate 220. Moreover, because the region where the abutting ball 530 abuts can have elastic deformation, precision of a size of the abutting ball 530 may be set lower, thereby reducing the manufacturing costs of the camera module.

Optionally, the first through hole 222 may be a strip-shaped hole, and an extending direction of the strip-shaped hole is a direction from an outer side of the second module housing 200 to an inner side of the second module housing 200. Certainly, the first through hole 222 may also be in another structure. This is not limited herein. A structure of the second through hole 223 may be the same as that of the first through hole 222. This is not described herein again.

In another optional embodiment, the camera body 400 may include a camera 410 and a second bracket 420. The second bracket 420 may surround the camera 410, and the first bracket 300 and the second bracket 420 may be connected through the first rotating member. In this case, the camera 410 and the second bracket 420 are fixedly connected, the first bracket 300 and the second bracket 420 are rotatably connected through the first rotating member, and the camera 410 rotates with the second bracket 420. In this solution, the second bracket 420 surrounds the camera 410, and can be configured to protect the camera 410, so that the camera 410 is not easy to bump against another component of the camera module during rotation, thereby improving the reliability and security of the camera module.

Optionally, the second bracket 420 may be an annular plate, and may be provided with a first mounting hole for mounting the following magnet assembly 620, thereby reducing a volume of the electronic device. Two opposite sides of the second bracket 420 are provided with an avoiding notch, and part of the first bracket 300 can extend into the first module housing 100 through the avoiding notch, and is connected to the first module housing 100. Certainly, the second bracket 420 may also be in another structure. This is not limited herein.

In another optional embodiment, the driving mechanism 600 may include a coil assembly 610 and a magnet assembly 620. The coil assembly 610 and the magnet assembly 620 may be arranged opposite to each other, and may be configured to drive the camera module, the first bracket 300, and the first module housing 100 to rotate.

An energized coil is subjected to an Ampere's force in a magnetic field. When the coil assembly 610 is located in a magnetic field generated by the magnet assembly 620, the coil assembly 610 is subjected to an Ampere's force. The Ampere's force can drive the camera body 400, the first bracket 300, and the first module housing 100 to rotate. A direction of the force on the camera module may be determined according to the left-hand rule. The left-hand rule is a well-known technique, and therefore is not described herein again.

In this solution, the driving mechanism 600 has fewer components and parts. Therefore, the camera module has a simple structure, and the driving mechanism 600 occupies a small proportion of a mounting position of the camera module, so that the camera module has a small volume.

Besides, in the driving mechanism 600, by changing a direction of a current of the coil assembly 610, a direction of the camera body 400 can be changed, so that the camera body 400 can flexibly change the direction, thereby improving the image stabilization performance of the camera module.

There are many structures that can perform a corresponding driving function, for example, a pneumatic transmission mechanism realized by using a piston mechanism or a hydraulic transmission mechanism, or a screw transmission mechanism, a gear and rack transmission mechanism, or the like. These transmission mechanisms can drive the camera body 400, the first bracket 300, and the first module housing 100 to rotate. Alternatively, a shape memory alloy structural member is used to drive the camera body 400, the first bracket 300, and the first module housing 100 to rotate by restoring the shape of the structural member.

In a specific embodiment, the coil assembly 610 may include a first coil, a second coil, and a third coil, and the magnet assembly 620 may include a first magnet, a second magnet, and a third magnet. The first coil, the second coil, and the third coil are spaced apart along a circumferential direction of the first module housing 100. The first magnet and the second magnet may be located on two adjacent sides of the camera body 400, the third magnet is located on the second module housing 200, and third magnet is arranged opposite to the first magnet or second magnet.

The first coil and the first magnet are arranged opposite to each other, and in a case that the first coil is energized, the first coil and the first magnet drive the camera body 400 to rotate around the first axis.

The second coil and the second magnet are arranged opposite to each other, and in a case that the second coil is energized, the second coil and the second magnet drive the first bracket 300 to rotate around the second axis.

The third coil and the third magnet are arranged opposite to each other, and in a case that the third coil is energized, the third coil and the third magnet drive the first module housing 100 to rotate around the third axis.

In this solution, a corresponding magnet and coil can generate a magnetic field force, so as to drive a corresponding component to rotate. Therefore, the camera module has a simple structure.

To further simplify the structure of the camera module, in another optional embodiment, the camera module disclosed in this application further includes a circuit board 800. The first coil, the second coil, and the third coil may all be arranged on the circuit board 800 and are electrically connected to the circuit board 800. In this case, the circuit board 800 is configured to control the first coil, the second coil, and the third coil to be energized. In this solution, the first coil, the second coil, and the third coil are connected to the same circuit board 800. Therefore, there is no need to configure a circuit board 800 for each coil independently, so that the structure of the camera module is simpler and more compact.

Optionally, the circuit board 800 may include a first bending section, a second bending section, and a third bending section that are connected in sequence. The first coil may be arranged on the first bending section, the second coil may be arranged on the second bending section, and the third coil may be arranged on the third bending section. The first bending section, the second bending section, and the third bending section are respectively pasted on three surfaces of the first module housing 100. Certainly, the circuit board 800 may also be in another structure. This is not limited herein.

To further reduce the volume of the camera module, a surface of the first module housing 100 may be further provided with a second mounting hole. The second mounting hole is configured to mount the coil assembly 610, so as to accommodate the coil assembly 610 in the second mounting hole, thereby reducing the volume of the camera module.

In another optional embodiment, the camera module disclosed in this application may further include at least one detection element 700. The at least one detection element 700 may be arranged on the circuit board 800 and is configured to detect an offset angle of the camera body 400. In this solution, the detection element 700 may measure the offset angle of the camera body 400 in real time, so as to ensure the image stabilization effect of the camera module. The detection element 700 may be a Hall chip, and certainly, may also be a chip of another type. This is not limited herein.

Optionally, the circuit board 800 may further be provided with a control chip 810. The control chip 810 is electrically connected to the circuit board 800, and may control a current of the coil assembly 610 according to a detection signal of a gyroscope or the detection element 700. In this way, magnetic fields of different intensity are generated in different regions, so that the camera module rotates appropriately to offset effects of external jitters.

During the specific operation, when a gyroscope inside the electronic device or the camera module detects that the camera module is inclined, the gyroscope obtains data such an angle of inclination of the camera module and transmits the data to the control chip 810. The control chip 810 inputs a corresponding angle compensation amount, and outputs a corresponding current, so as to control a corresponding coil to be energized, to drive the camera body 400 to rotate.

When the camera module rotates, the detection element 700 can detect the offset angle of the camera body 400, and a detection signal can be fed back to the control chip 810, so as to correct the offset angle of the camera body 400.

Specifically, there may be three detection elements 700, and the three detection elements 700 are correspondingly mounted at a central position of a corresponding coil respectively. In this case, each detection element 700 can detect an offset in a corresponding direction, thereby improving the precision of detection.

The first bracket 300 may be of various types of structures. In an optional embodiment, the first bracket 300 may include a bracket body 310, a first connecting arm 320, and a second connecting arm 330. An end of the first connecting arm 320 is fixedly connected to the bracket body 310, and an other end of the first connecting arm 320 is rotatably connected to the camera body 400 through the first rotating member. An end of the second connecting arm 330 is fixedly connected to the bracket body 310, and an other end of the second connecting arm 330 may be connected to the first module housing 100 through the second rotating member. In this solution, the first connecting arm 320 and the second connecting arm 330 are a cantilever structure, and may respectively extend into the first bracket 300 and the first module housing 100, thereby better facilitating a miniature design of the overall camera module.

To further improve the connection stability of the camera module, in another optional embodiment, there may be two first connecting arms 320 and two second connecting arms 330. The two first connecting arms 320 are diagonally distributed on two sides of the camera body 400, and the two second connecting arms 330 are diagonally distributed on two other sides of the camera body 400. In this case, each first connecting arm 320 may be rotatably connected to a first rotating member, and each second connecting arm 330 may be rotatably connected to a second rotating member, thereby undoubtedly improving balance of rotation and support.

Optionally, the first connecting arm 320 and the second connecting arm 330 both bend toward the first inner cavity, and extend into the first inner cavity in this case. Therefore, the first connecting arm 320 and the second connecting arm are not easy to be exposed, and therefore are not easy to be damaged, thereby increasing the service life of the first bracket 300.

To improve the rotation performance of the camera body 400 and the first bracket 300, in another optional embodiment, the first rotating member may include two first balls. The two first balls may be located between the camera body 400 and the first bracket 300, and may be distributed along the first axis or distributed symmetrically relative to the first axis. In this solution, the first balls have a small area of contact with the camera body 400 and the first bracket 300, so that friction between the first balls and the camera body 400 and between the first balls and the first bracket is small. In addition, the first balls may be in a rolling fit with both the camera body 400 and the first bracket 300, so that the camera body 400 and the first bracket 300 rotate more flexibly, and the rotation performance of the camera body 400 and the first bracket 300 is better.

Moreover, the first rotating member may also be a roller, and the roller may be in a rolling fit with both the camera body 400 and the first bracket 300.

To improve the rotation performance of the first module housing 100 and the first bracket 300, the second rotating member may include two second balls. The two second balls may be located between the first bracket 300 and the first module housing 100, and may be distributed along the second axis or distributed symmetrically relative to the second axis. In this solution, the second balls have a small area of contact with the first module housing 100 and the first bracket 300, so that friction between the second balls and the first module housing 100 and between the second balls and the first bracket 300 is small. In addition, the second balls may be in a rolling fit with both the first module housing 100 and the first bracket 300, so that the first module housing 100 and the first bracket 300 rotate more flexibly, and the rotation performance of the first module housing 100 and the first bracket 300 is better.

Moreover, the second rotating member may also be a roller, and the roller may be in a rolling fit with both the first module housing 100 and the first bracket 300.

Based on the camera module disclosed in the embodiments of this application, an embodiment of this application further discloses an electronic device, and the disclosed electronic device includes the camera module described in any one of the foregoing embodiments.

The electronic device disclosed in this embodiment of this application may be a device such as a smart watch, a smart phone, or a tablet computer. The specific type of the electronic device is not limited in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A camera module, comprising a first module housing, a second module housing, a first bracket, a first rotatable member, a second rotatable member, a third rotatable member, a driving mechanism, and a camera body, wherein
the second module housing is provided with a second inner cavity, and the first module housing is located in the second inner cavity;
the first module housing is provided with a first inner cavity, at least part of the first bracket is arranged in the first inner cavity, at least part of the camera body is arranged in the first inner cavity, the camera body is connected to the first module housing through the first bracket, the first rotatable member is arranged between the first bracket and the camera body, the first bracket is rotatably connected to the camera body through the first rotatable member, and the driving mechanism drives the camera body to rotate relative to the first bracket around a first axis;
the second rotatable member is arranged between the first bracket and the first module housing, the first bracket is rotatably connected to the first module housing through the second rotatable member, and the driving mechanism drives the first bracket to rotate together with the camera body relative to the first module housing around a second axis; and
the first module housing is rotatably connected to the second module housing through the third rotatable member, the driving mechanism drives the first module housing to rotate together with the camera body and the first bracket relative to the second module housing around a third axis, the third axis intersects with a first plane, and the first plane is a plane in which the first axis and the second axis are located.

2. The camera module according to claim 1, wherein the first module housing comprises a first framework, a first top plate, and a first bottom plate, wherein the first top plate is arranged on an end opening of an end of the first framework, the first bottom plate is arranged on an end opening of an other end of the first framework, the first framework, the first top plate, and the first bottom plate form the first inner cavity, the first top plate is provided with a first avoidance hole, and the first avoidance hole is connected to the first inner cavity;

the second module housing comprises a second framework, a second top plate, and a second bottom plate, wherein the second top plate is arranged on an end opening of an end of the second framework, and the second bottom plate is arranged on an end opening of an other end of the second framework, the second framework, the second top plate, and the second bottom plate form the second inner cavity, the second top plate is provided with a second avoidance hole, and the second avoidance hole is connected to the second inner cavity; and the first avoidance hole and the second avoidance hole are distributed opposite to each other.

3. The camera module according to claim 2, wherein the third rotatable member is arranged between the first bottom plate and the second bottom plate, the third rotatable member comprises a central ball and a plurality of edge balls, a center of the central ball coincides with the third axis, and the plurality of edge balls surround the central ball.

4. The camera module according to claim 3, wherein one of the first bottom plate and the second bottom plate is provided with a first positioning hole, the other is provided with a sliding groove, an extending direction of the sliding groove is the same as a rotating direction of the first module housing, a quantity of sliding grooves, a quantity of first positioning holes, and a quantity of edge balls are the same, the first positioning hole and the edge ball are in limiting coordination, part of the edge ball is located in the sliding groove, and the sliding groove is in a sliding fit with the edge ball; and/or a second positioning hole is opened on the first bottom plate and/or the second bottom plate, part of the central ball is located in the second positioning hole, and the second positioning hole and the central ball are in limiting coordination.

5. The camera module according to claim 3, wherein the camera module is provided with an abutting ball, and the abutting ball is arranged between the second top plate and the first top plate.

6. The camera module according to claim 5, wherein the first top plate or the second top plate is provided with a third positioning hole, the third positioning hole and the abutting ball are in a one-to-one correspondence, and part of the abutting ball is located in the third positioning hole.

7. The camera module according to claim 5, wherein the first top plate or the second top plate is provided with a first through hole and a second through hole, and the abutting ball is located between the first through hole and the second through hole.

8. The camera module according to claim 1, wherein the camera body comprises a camera and a second bracket, the second bracket surrounds the camera, and the first bracket and the second bracket are connected to each other through the first rotatable member.

9. The camera module according to claim 8, the second bracket is an annular plate, and is provided with a first mounting hole, two opposite sides of the second bracket are provided with an avoiding notch, and part of the first bracket extends through the avoiding notch into the first module housing, and is connected to the first module housing.

10. The camera module according to claim 1, wherein the driving mechanism comprises a coil assembly and a magnet assembly, and the coil assembly and the magnet assembly are arranged opposite to each other and are configured to drive the camera module, the first bracket, and the first module housing to rotate.

11. The camera module according to claim 10, wherein the coil assembly comprises a first coil, a second coil, and a third coil, and the magnet assembly comprises a first magnet, a second magnet, and a third magnet;

the first coil, the second coil, and the third coil are spaced apart along a circumferential direction of the first module housing; the first magnet and the second magnet are located on two adjacent sides of the camera body, the third magnet is located on the second module housing, and the third magnet is arranged opposite to the first magnet or the second magnet;

the first coil and the first magnet are arranged opposite to each other, and in a case that the first coil is energized, the first coil and the first magnet drive the camera body to rotate around the first axis;

the second coil and the second magnet are arranged opposite to each other, and in a case that the second coil is energized, the second coil and the second magnet drive the first bracket to rotate around the second axis; and the third coil and the third magnet are arranged opposite to each other, and in a case that the third coil is energized, the third coil and the third magnet drive the first module housing to rotate around the third axis.

12. The camera module according to claim 11, further comprising a circuit board, wherein the first coil, the second coil, and the third coil are all arranged on the circuit board and are electrically connected to the circuit board.

13. The camera module according to claim 12, further comprising at least one detection clement, wherein the at least one detection element is arranged on the circuit board and is configured to detect an offset angle of the camera body.

14. The camera module according to claim 1, wherein the first bracket comprises a bracket body, a first connecting arm, and a second connecting arm, wherein an end of the first connecting arm is fixedly connected to the bracket body, an other end of the first connecting arm is rotatably connected to the camera body through the first rotatable member, an end of the second connecting arm is fixedly connected to the bracket body, and an other end of the second connecting arm is connected to the first module housing through the second rotatable member.

15. The camera module according to claim 14, wherein two first connecting arms and two second connecting arms are provided, the two first connecting arms are diagonally distributed on two sides of the camera body, and the two second connecting arms are diagonally distributed on two other sides of the camera body.

16. The camera module according to claim 14, wherein the first connecting arm and the second connecting arm both bend toward the first inner cavity and extend into the first inner cavity.

17. The camera module according to claim 1, wherein every two of the first axis, the second axis, and the third axis intersect with each other.

18. The camera module according to claim 1, wherein the first rotatable member comprises two first balls, and the two first balls are located between the camera body and the first bracket, and are distributed along the first axis.

19. The camera module according to claim 1, wherein the second rotatable member comprises two second balls, and the two second balls are located between the first bracket and the first module housing, and are distributed along the second axis.

20. An electronic device, comprising a camera module, wherein the camera module comprises: a first module housing, a second module housing, a first bracket, a first rotatable member, a second rotatable member, a third rotatable member, a driving mechanism, and a camera body, wherein
- the second module housing is provided with a second inner cavity, and the first module housing is located in the second inner cavity;
- the first module housing is provided with a first inner cavity, at least part of the first bracket is arranged in the first inner cavity, at least part of the camera body is arranged in the first inner cavity, the camera body is connected to the first module housing through the first bracket, the first rotatable member is arranged between the first bracket and the camera body, the first bracket is rotatably connected to the camera body through the first rotatable member, and the driving mechanism drives the camera body to rotate relative to the first bracket around a first axis;
- the second rotatable member is arranged between the first bracket and the first module housing, the first bracket is rotatbly connected to the first module housing through the second rotatable member, and the driving mechanism drives the first bracket to rotate together with the camera body relative to the first module housing around a second axis; and
- the first module housing is rotatably connected to the second module housing through the third rotatable member, the driving mechanism drives the first module housing to rotate together with the camera body and the first bracket relative to the second module housing around a third axis, the third axis intersects with a first plane, and the first plane is a plane in which the first axis and the second axis are located.

* * * * *